Aug. 18, 1931.  W. C. BROADWELL  1,819,455
VEHICLE CUSHIONING OR SHOCK ABSORBING DEVICE
Filed Jan. 10, 1925
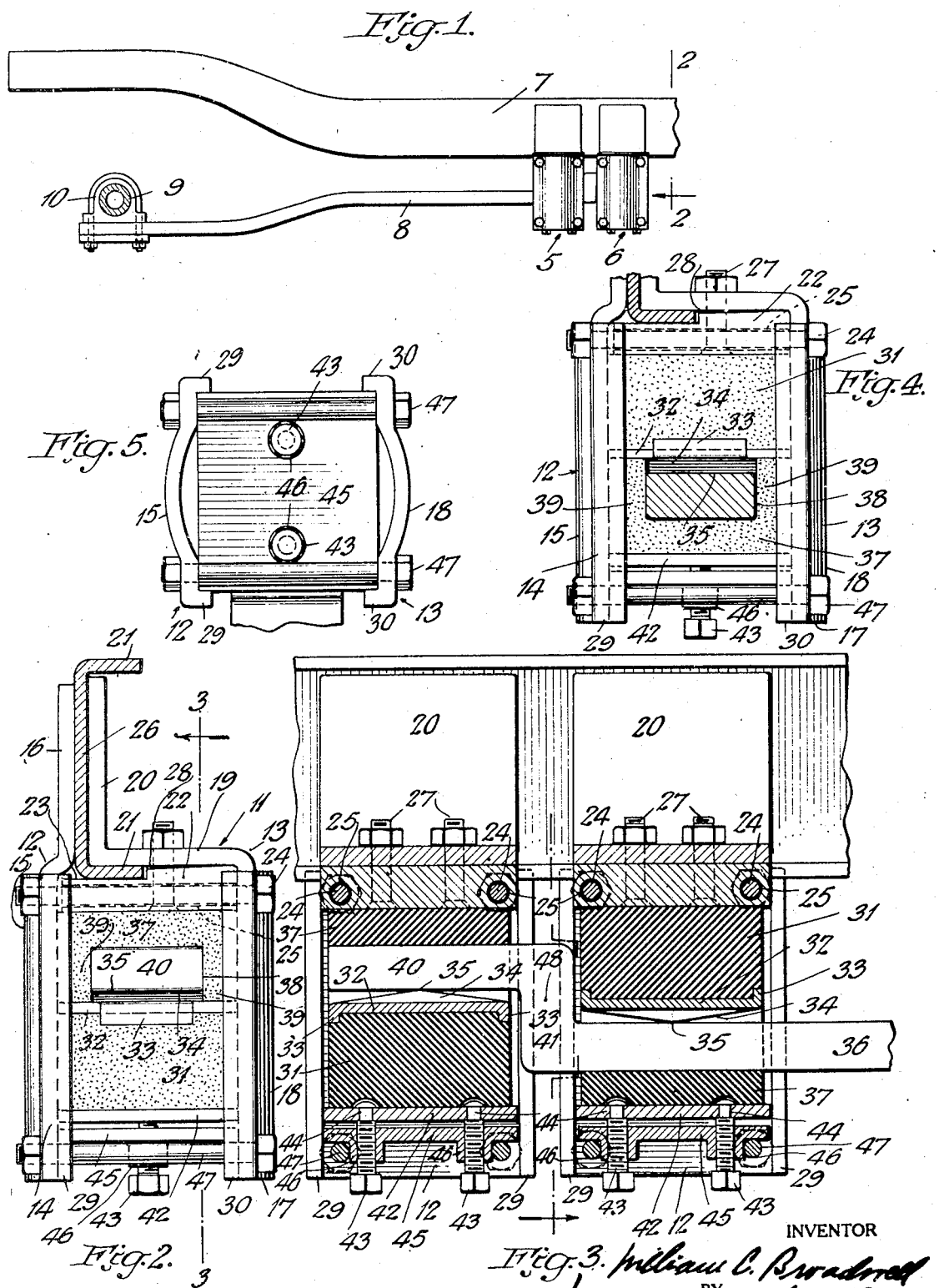

Patented Aug. 18, 1931

1,819,455

UNITED STATES PATENT OFFICE

WILLIAM C. BROADWELL, OF BROOKLYN, NEW YORK

VEHICLE CUSHIONING OR SHOCK ABSORBING DEVICE

Application filed January 10, 1925. Serial No. 1,522.

This invention relates to vehicle cushioning or shock absorbing devices and is herein shown adapted for use in connection with automobiles.

An important object of the invention is to provide an improved device of the character mentioned which is simple in construction, easily installed and reliable as well as effective in operation.

Other objects and certain advantages of the invention will become apparent from the following description when taken in connection with the accompanying drawings in which Figure 1 is a fragmental view in elevation of an automobile chassis in connection with which the device embodying my invention is shown;

Figure 2 is a sectional view taken on line 2—2, of Fig. 1;

Figure 3 is a longitudinal sectional view taken on line 3—3, of Fig. 2;

Figure 4 is a transverse sectional view taken on line 4—4, of Fig. 3;

Figure 5 is a bottom plan view of the unit shown at the left in Fig. 3.

In practice as many of the devices embodying my invention may be employed in connection with the vehicle as there are wheels to the vehicle, but I have herein shown only one such device and have illustrated the same as of a design particularly adapted for use in connection with automobiles.

The device embodying my invention is herein shown as comprising a plurality of cushioning units 5 and 6, adapted for connection to a side member 7 of an automobile frame, the cushioning units having associated therewith an elongated lever or fulcrum 8, which may be either rigid in itself or resilient. The lever or fulcrum 8 is adapted to be connected to the automobile axle 9 by any suitable means such as a clamp 10. Each of the cushioning units comprises a housing 11 made up of side members 12 and 13. The side member 12 is in the form of a plate 14 which is bilged, as shown at 15, and terminates in an upwardly projecting flange 16, adapted to engage the outer face of the side member 7. The side member 13 comprises a plate 17 which is bilged, as shown at 18, and terminates in a ledge or base portion 19, having a flange 20 carried thereby, which flange is adapted to engage the inner face of the side member 7 intermediate the upper and lower flanges 21 thereof. Intermediate the side members 14 and 17 there is arranged a clamping plate 22 which is cut away as shown at 23 in order to accommodate the lower flange 21 of the side member 7. Through this clamp plate is passed a pair of bolts 24, the openings 25 formed in the plate and adapted for the reception of the bolts being somewhat larger than the bolts themselves for a purpose which will hereinafter more clearly appear. These bolts pass also through the side members 14 and 17 and function as a means for so drawing the side members together as to force the flanges 16 and 20 thereof into intimate engagement with the web portion 26 of the frame member 7. In order to provide for a relative movement between the side members 14 and 17, when clamping the same in position upon the side member, the clamping plate 22 is somewhat shorter than the space existing between the side members 14 and 17 after they have been so drawn together that the flanges 16 and 20 thereof intimately engage the side member 7 as shown. As a means for further locking the side members 14 and 17 in position upon the frame member 7 I have provided a pair of clamp bolts 27 which are passed vertically through the clamp plate 22 and the ledge 19, as shown. These clamp bolts, as will be readily appreciated, serve to draw the ledge 19, as well as the clamp plate 22, into intimate binding engagement with the lower flange 21 of the frame 7. In order to effect this binding engagement it becomes necessary to permit a relative movement between the clamp plate 22 and the ledge 19 and to this end I form the openings 25, through which the bolts 24 are passed, somewhat larger than the diameter of these bolts. It will, of course, be understood that the thickness of the clamp plate 22 at its thickest portion is such that a relatively small clearance, as shown at 28, between the clamp plate and the flange 19 is afforded when these elements are drawn into intimate binding engagement with the lower flange 21 of the frame member 7. From the construction just described it will be appreciated that I have provided a relatively simple, but yet highly effective, means for clamping the housings 11 of each of the units 5 and 6 upon the frame member 7 without necessitating a modification of the frame member 7 in any particular which may tend to weaken the same or otherwise impair its function as a structural unit of the automobile chassis.

Each of the side members 14 and 17 are provided with vertically disposed flanges 29 and 30 which not only strengthen the side members themselves but afford in effect a means for effectively retaining within the housings 11 certain cushioning elements hereinafter more particularly described.

Within the housing 11, of the cushioning unit 5, there is arranged a block 31 of resilient material, preferably rubber, upon the lower face of which is carried a bearing block 32 having at opposite ends upturned lips 33 sunk into the rubber as shown most clearly in Figure 3, the lips being utilized to prevent the plate 32 from becoming laterally displaced. This bearing plate is constructed with a rib 34 extending transversely across the same and terminating in a relatively small bearing surface 35 adapted to engage the elongated portion 36 of the lever or fulcrum 8. Within the housing 11 of the cushioning unit 5 and below the cushioning element 31 there is arranged another cushioning element 37, preferably constructed from rubber. This cushioning element is provided longitudinally with a recess 38 adapted for the reception of the elongated portion 36 of the arm or fulcrum 8 and is provided with upstanding wings 39 lying on opposite sides of the lever 8, as shown.

Within the housing 11 of the cushioning unit 6 there is arranged another pair of cushioning elements 31 and 37 which are identical with those described in connection with the cushioning unit 5. The cushioning elements 31 and 37, arranged within the housing 11 of the cushioning device 6, however, are inverted with respect to those carried within the housing 11 of the cushioning unit 5. That is to say, the cushioning element 37, in this instance, is arranged immediately below the clamp plate 22 and the cushioning element 31 is positioned immediately beneath the cushioning element 37, the cushioning element 31 being provided with a bearing plate 32 identical with that described in connection with the cushioning unit 5. This bearing plate, however, is adapted to receive thereon a shorter arm 40 of the lever or fulcrum 8, which arm terminates in a depending angular portion 41 formed integral with the elongated portion 36 of the lever 8.

The cushioning elements 31 and 37 are retained within the housings 11, of the respective cushioning devices 5 and 6 by means of abutments 42 confined between the flanges 29 and 30 of the respective side members 14 and 17. These abutments are adapted for vertical adjustment for a reason hereinafter more clearly explained, such adjustment being made possible by means of adjusting screws 43 which are swiveled to the plate 42 as shown at 44. These screws are carried by anchor plates 45 provided with depending bosses 46 through which the screws pass, the depending bosses being utilized to provide for relatively long screw-threaded engagement between the screws 43 of the plates 45. The plates 45 are confined within the housings 11, of the cushioning units 5 and 6, by means of the flanges 29 and 30 and are supported within the respective housings by means of transversely disposed bolts 47 passing through the side members 14 and 17, as shown.

In installing the device embodying my invention the housings 11 are secured to the frame member 7 in the manner described after which the uppermost cushioning devices are introduced. Having placed these cushioning devices in their respective positions, as shown in Figure 3, the lever or fulcrum 8 is next assembled whereupon the lowermost cushioning devices are introduced. With the several cushioning elements positioned, as shown in Figure 3, the abutments 42 together with the adjusting screws and clamp plates are inserted into the housings after which the bolts 47 are passed through the side members 14 and 17 and locked in their respective positions. The adjusting screws 43 are then run down so as to move the abutment plates 42 into firm contact with the adjacent cushioning elements. The lever or fulcrum may now be attached to the axle, and if the automobile has been so supported, during the assembling, as to relieve the wheels thereof from the weight of the automobile the car is next lowered, as a result of which its weight is carried by the lever or fulcrum 8. When the lever or fulcrum has thus been subjected to the weight of the automobile its free end will so move as to rotate the fulcrum about an imaginary axis passing transversely through the portion 41 in the vicinity of the point indicated by the numeral 48, as a result of which the cushioning elements 31 are both subjected to compression. If the abutment plates 42 have not been moved into a sufficient compressing engagement with the adjusting cushioning elements during the assembling it may be that the cushioning elements 37 are not subjected to proper normal compression after the automobile is let down, and if such is the case the adjusting screws 43 may be again adjusted to exert the proper compression influence upon the cushioning elements 37 so that the device will function to the best advantage when subjected to road conditions.

Not only do the adjustment screws 43 afford means for placing the cushioning elements 31 and 37 under proper compression initially, that is to say, when the device is put into use, but they afford means for maintaining these elements under proper compression if the rubber should become more or less "set" after prolonged use.

In operation when the axle 9 is moved towards the frame of the automobile, the cushioning elements 31 are compressed to a more or less degree depending upon the extent of the relative movement between the axle and the frame. As a result of this compression, the rubber, from which the cushioning elements are constructed, is subjected to displacement, such displacement being accommodated by reason of the bilged portions 15 and 18 formed in the side members 14 and 17, respectively. On the rebound of the axle, or rather upon a relative movement of the axle away from the frame, the cushioning elements 31 assume their normal shapes, respectively, and if the rebound is of a sufficient magnitude the cushioning elements 37 are subjected to compression as a result of such rebound. The cushioning elements 37, being subjected to undue compression on rebound, undergo distortion or displacement the same as in the case of the cushioning elements 31, although obviously not to such a great extent, but such distortion or displacement as does occur is accommodated by reason of the bilged portions 15 and 18 formed in the side members 14 and 17, respectively, as will be readily appreciated.

The structure herein shown not only permits the above pivotal movements of the lever 8 about the imaginary axis in the vicinity of the point 48, but it also permits such axis to shift slightly from place to place under various conditions of operation. For example, the imaginary axis may temporarily move slightly to the left, as viewed in Figure 3, should the vehicle wheel suddenly meet with an obstruction tending to retard its forward progress; on the other hand the imaginary axis might slightly tilt in either direction from a horizontal plane if the lever is subjected to a torsional strain, as for example, when only one wheel of the vehicle passes over an obstruction and thereby lifts one end of the axle without affecting the other end thereof.

The cushioning elements 31 and 37 afford means for not only yieldably and resiliently connecting the lever 8 to the vehicle frame, but also provide for a universal connection of the lever with said frame, the result being that the axle of the vehicle is capable of slight movement in all directions without unduly subjecting the lever 8 or any of its associated elements to undue strains and stresses.

From the foregoing description it is obvious that the device embodying my invention may be employed as a substitute for the usual form of springs used in various types of vehicles, and particularly automobiles. Not only is my device adapted to be used as a substitute for spring suspensions generally employed, but it may also be effectively used in conjunction therewith as a shock absorber without departing from the spirit of the invention. Furthermore, while I have shown in this instance two cushioning units, it will be understood that a greater number of such units may be employed under certain conditions if desired, the type of vehicle or the weight thereof being, possibly, one of the factors to be taken into consideration in determining the number of cushioning units found most desirable to employ.

Having thus described my invention 1 claim:

1. In a cushioning device for a vehicle having an axle and a frame; a lever, one end of which is adapted to be connected to said axle; and yieldable means universally connecting the other end of said lever to said frame and comprising a pair of cushioning units associated with said other end of said lever and adapted for connection to said frame, said cushioning units comprising cushioning elements arranged upon opposite sides of said lever, said cushioning elements being spaced from each other longitudinally of said lever and adapted to support the weight of the vehicle, and a second set of cushioning elements arranged upon opposite sides of said lever in a spaced relation to the first mentioned cushioning elements and in a spaced relation to each other longitudinally of said lever.

2. In a cushioning device for a vehicle having an axle and a frame; a lever, one end of which is adapted to be connected to said axle, yieldable means universally connecting the other end of said lever to said frame and comprising a pair of cushioning units associated with said other end of said lever and adapted for connection to said frame, said cushioning units comprising cushioning elements arranged upon opposite sides of said lever, said cushioning elements being spaced from each other longitudinally of said lever and adapted to support the weight of the vehicle, a second set of cushioning elements arranged upon opposite sides of said lever in a spaced relation to the first mentioned cushioning elements and in a spaced relation to each other longitudinally of said lever, and bearing members arranged intermediate said lever and the first mentioned cushioning elements respectively.

3. In a cushioning device for a vehicle having an axle and a frame, a lever one end of which is adapted to be connected to said axle, whereas the other end is adapted to be connected to said frame and fulcrum about an axis, a pair of cushioning units associated with said other end of said lever and adapted for connection to said frame, said cushioning units comprising cushioning elements arranged upon opposite sides of said lever, said cushioning elements being spaced from each other longitudinally of said lever and adapted to support the weight of the vehicle, a second set of cushioning elements arranged upon opposite sides of said lever in a spaced relation to the first mentioned cushioning elements and in a spaced relation to each other longitudinally of said lever, and bearing members arranged intermediate said lever and the first mentioned cushioning elements respectively, said bearing members being each provided with a rib having line contact with said lever.

4. In a cushioning device for a vehicle having an axle and a frame, a lever, one end of which is adapted to be connected to said axle, yieldable means universally connecting the other end of said lever to said frame, said yieldable means being arranged upon opposite sides of said lever and adapted to resist the universal movement of said lever, said yieldable means being in the form of cushioning elements, a housing for said cushioning elements, and adjustable means supported by said housing for adjusting one of said cushioning elements.

5. In a cushioning device for a vehicle having an axle and a frame, a lever, one end of which is adapted to be connected to said axle, yieldable means universally connecting the other end of said lever to said frame, said yieldable means being arranged upon opposite sides of said lever and adapted to resist the universal movement of said lever, said yieldable means being in the form of cushioning elements, a housing for said cushioning elements, and adjustable means for adjusting one of said cushioning elements, said adjustable means being in the form of movable abutments.

6. In a cushioning device for a vehicle having an axle and a frame, a lever, one end of which is adapted to be connected to said axle, whereas the other end terminates in an angular portion carrying an extension and is adapted to be connected to said frame and fulcrum about an axis, and yieldable means carried upon opposite sides of said angular portion and upon opposite sides of said lever for resisting the fulcruming movement of said lever, and means for anchoring said yieldable means in a given position with respect to said frame whereby said lever is yieldably connected to said frame.

7. In a cushioning device for a vehicle having an axle and a frame, a lever, one end of which is adapted to be connected to said axle, whereas the other end terminates in an angular portion carrying an extension and is adapted to be connected to said frame and fulcrum about an axis, and yieldable means carried upon opposite sides of said angular portion and upon opposite sides of said lever for resisting the fulcruming movement of said lever, means for anchoring said yieldable means in a given position with respect to said frame whereby said lever is yieldably connected to said frame, said yieldable means being in the form of a pair of cushioning elements, and a second pair of cushioning elements arranged in a spaced relation with respect to each other and with respect to the first named cushioning elements.

8. In combination, a vehicle frame having an axle, a lever extending lengthwise of said frame, connecting means rigidly securing one end of said lever to said axle, and yieldable means universally connecting only the other end of said lever to said frame and adapted to resist the universal movement of said lever, said yieldable means being in the form of rubber cushioning elements arranged upon opposite sides of said lever adjacent only said other end of said lever.

9. In combination, a vehicle frame having an axle, a lever extending lengthwise of said frame, connecting means rigidly securing one end of said lever to said axle, and yieldable means universally connecting only the other end of said lever to said frame and adapted to resist the universal movement of said lever, said yieldable means being in the form of rubber cushioning elements arranged upon opposite sides of said lever in a spaced relation longitudinally of said lever adjacent only said other end of said lever.

10. In combination, a vehicle frame having an axle, a lever extending lengthwise of said frame, connecting means rigidly securing one end of said lever to said axle, and yieldable means universally connecting only the other end of said lever to said frame, said yieldable means comprising a pair of cushioning units associated only with said other end of said lever and connected to said frame, each of said cushioning units including cushioning elements arranged upon opposite sides of said lever adjacent only said other end of said lever.

11. In combination, a vehicle frame, an axle, frame-supporting means intermediate said frame and said axle for supporting the frame with respect to the axle and consisting of a lever rigidly connected at one end to said axle, and yieldable means in contact with and universally connecting only the other end of said lever to said frame.

12. In combination, a vehicle frame, an axle, frame-supporting means intermediate said frame and said axle for supporting the frame with respect to the axle and consisting of a lever rigidly connected at one end to said axle, and yieldable means in contact with and universally connecting only the other end of said lever to said frame, said yieldable means serving to resist universal movement of said lever with respect to said frame.

13. In combination, a vehicle frame having an axle, frame-supporting means intermediate said axle and said frame for supporting the frame with respect to the axle and consisting of a lever connected at one end to said axle, and yieldable means universally connecting the other end of said lever to said frame and serving to resist the universal movement of said lever with respect to said frame.

14. In combination, a vehicle frame having an axle, frame-supporting means intermediate said axle and said frame for supporting the frame with respect to the axle and consisting of a lever connected at one end to said axle, and yieldable means universally connecting the other end of said lever to said frame and serving to resist the universal movement of said lever with respect to said frame, said yieldable means comprising a rubber cushioning element anchored with respect to said frame and cooperating with said other end of said lever.

15. In combination, a vehicle frame having an axle, frame-supporting means intermediate said axle and said frame for supporting the frame with respect to the axle and consisting of a lever connected at one end to said axle, and yieldable means universally connecting the other end of said lever to said frame and serving to resist the universal movement of said lever with respect to said frame, said yieldable means comprising a pair of rubber cushioning elements arranged upon opposite sides of said lever and anchored with respect to said frame and cooperating with said other end of said lever.

In testimony whereof, I have affixed my signature to this specification.

WILLIAM C. BROADWELL.